US010662886B2

(12) United States Patent
Miyamoto et al.

(10) Patent No.: US 10,662,886 B2
(45) Date of Patent: May 26, 2020

(54) CONTROL DEVICE FOR FUEL INJECTION DEVICE (71) Applicant: HITACHI AUTOMOTIVE SYSTEMS, LTD., Ibaraki (JP)

(72) Inventors: Akiyasu Miyamoto, Tokyo (JP); Masahiro Toyohara, Hitachinaka (JP); Osamu Mukaihara, Hitachinaka (JP); Yoshihito Yasukawa, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 104 days.

(21) Appl. No.: 16/070,177

(22) PCT Filed: Dec. 22, 2016

(86) PCT No.: PCT/JP2016/088267
§ 371 (c)(1),
(2) Date: Jul. 13, 2018

(87) PCT Pub. No.: WO2017/126284
PCT Pub. Date: Jul. 27, 2017

(65) Prior Publication Data
US 2019/0024601 A1 Jan. 24, 2019

(30) Foreign Application Priority Data

Jan. 22, 2016 (JP) .................................. 2016-010232

(51) Int. Cl.
*F02D 41/20* (2006.01)
*F02M 51/06* (2006.01)
(Continued)

(52) U.S. Cl.
CPC ......... *F02D 41/20* (2013.01); *F02D 41/3005* (2013.01); *F02D 41/402* (2013.01);
(Continued)

(58) Field of Classification Search
CPC .... F02D 41/20; F02D 41/402; F02D 41/3005; F02D 2041/2037; F02D 2041/2044; F02D 2041/2051; F02M 51/0685; F02M 2200/50

See application file for complete search history.

(56) References Cited

U.S. PATENT DOCUMENTS

2008/0276907 A1* 11/2008 Abe .................. F02D 41/20
123/472
2012/0216783 A1* 8/2012 Kusakabe ............... F02D 41/20
123/490

FOREIGN PATENT DOCUMENTS

JP 2002-115591 A 4/2002
JP 2003-120848 A 4/2003
(Continued)

OTHER PUBLICATIONS

International Search Report dated Apr. 11, 2017 for the PCT International Application No. PCT/JP2016/088267.

*Primary Examiner* — Xiao En Mo
(74) *Attorney, Agent, or Firm* — Volpe and Koenig, P.C.

(57) ABSTRACT

A control device of a fuel injection device improves stabilization in an opening operation of a valve element and stabilizes an injection amount. The control device includes a valve element to open a fuel passage by being separated from a valve seat, a movable iron core to perform an opening/closing operation of the valve element, and a fixed iron core to attract the movable iron core when a current flows to a coil. The control device includes a control unit which performs an intermediate energization in which the coil is energized again to attract the movable iron core to the fixed iron core and then the energizing to the coil is blocked and the movable iron core is displaced in a direction away from the fixed core. The control unit controls whether the (Continued)

intermediate energization is performed according to an injection interval of the fuel injection device.

11 Claims, 6 Drawing Sheets

(51) Int. Cl.
  *F02D 41/40* (2006.01)
  *F02D 41/30* (2006.01)

(52) U.S. Cl.
  CPC . *F02M 51/0685* (2013.01); *F02D 2041/2037* (2013.01); *F02D 2041/2044* (2013.01); *F02D 2041/2051* (2013.01); *F02M 2200/50* (2013.01)

(56) References Cited

FOREIGN PATENT DOCUMENTS

| | | | |
|---|---|---|---|
| JP | 2008-280876 A | 11/2008 | |
| JP | 2012-177303 A | 9/2012 | |
| JP | 2014-129817 A | 7/2014 | |

* cited by examiner

CONTROL DEVICE FOR FUEL INJECTION DEVICE

TECHNICAL FIELD

The present invention relates to a control device of a fuel injection device.

BACKGROUND ART

In recent years, there is introduced a downsizing engine which is minimized by suppressing an exhaust amount and obtains power from a supercharger for the purpose of low fuel consumption of an internal combustion engine. In the downsizing engine, a pumping loss can be reduced by decreasing the exhaust amount, so that it is possible to achieve the low fuel consumption.

In the downsizing engine, the diameter of a cylinder in the engine tends to be reduced. Therefore, the injected fuel is attached to a cylinder wall, and thus there is a concern that exhaust performance is degraded. In addition, when a combustible fluid and the air are unevenly mixed, an unburned particulate material is exhausted, and the exhaust performance is degraded.

There is a split injection in which the fuel is injected by dividing a necessary fuel amount several times per combustion cycle for homogenization of an air-fuel mixture in the engine and for attachment of the fuel to the wall of the engine. In PTL 1 of the related art, there is disclosed a configuration in which a gap is provided in a movable iron core and a valve element in a displacement direction when such a split injection is performed. Therefore, only the movable iron core is operated before being energized to approach the movable iron core, so as to improve responsiveness of the valve element using kinetic energy.

CITATION LIST

Patent Literature

PTL 1: JP 2002-115591 A

SUMMARY OF INVENTION

Technical Problem

However, the movable iron core keeps on going downward after the valve is closed, the speed of the movable iron core is high at the time of returning to a valve-closing standby state, and a member of the upper portion of the valve element is lifted up. Therefore, in a case where an injection interval becomes short, the gap in the displacement direction becomes small, and an opening behavior is not stabilized.

An object of the invention is to provide a control device of a fuel injection device, in which the operation of the valve element is improved in stability and an injection amount is stabilized even in a case where the valve element receives kinetic energy from the movable iron core when a valve is opened and a fuel injection to the fuel injection device of which the valve is opened varies between a previous fuel injection (first fuel injection) and a later fuel injection (second fuel injection).

Solution to Problem

To achieve the above object, the present invention is a control device of a fuel injection device which includes a valve element to open a fuel passage by being separated from a valve seat, a movable iron core to perform an opening/closing operation of the valve element, and a fixed iron core to attract the movable iron core when a current flows to a coil, the control device including: a control unit which performs an intermediate energization in which the coil is energized again when the coil is energized to attract the movable iron core to the fixed iron core and then the energizing to the coil is blocked and the movable iron core is displaced in a direction away from the fixed core, wherein the control unit controls whether the intermediate energization is performed according to an injection interval of the fuel injection device.

Advantageous Effects of Invention

According to the invention, it is possible to provide a control device of a fuel injection device in which the operation of a valve element when a valve is opened is improved in stability, and an injection amount is stabilized even in a case where a fuel injection varies between a first fuel injection and a second fuel injection. The other configurations, operations, and effects of the invention will be described in detail in the following embodiments.

DESCRIPTION OF EMBODIMENTS

Hereinafter, embodiments of the invention will be described.

First Embodiment

Hereinafter, a first embodiment of the invention will be described. This embodiment relates to a control device which controls a fuel injection device used in an internal combustion engine. In the control device of an electromagnetic fuel injection device, a current flows to a coil to generate a magnetic flux in a magnetic circuit which includes a movable iron core and a fixed iron core, and a magnetic attraction force is applied to cause the movable iron core to be pulled toward the fixed iron core, so that a valve element is opened or closed.

Figure 1:
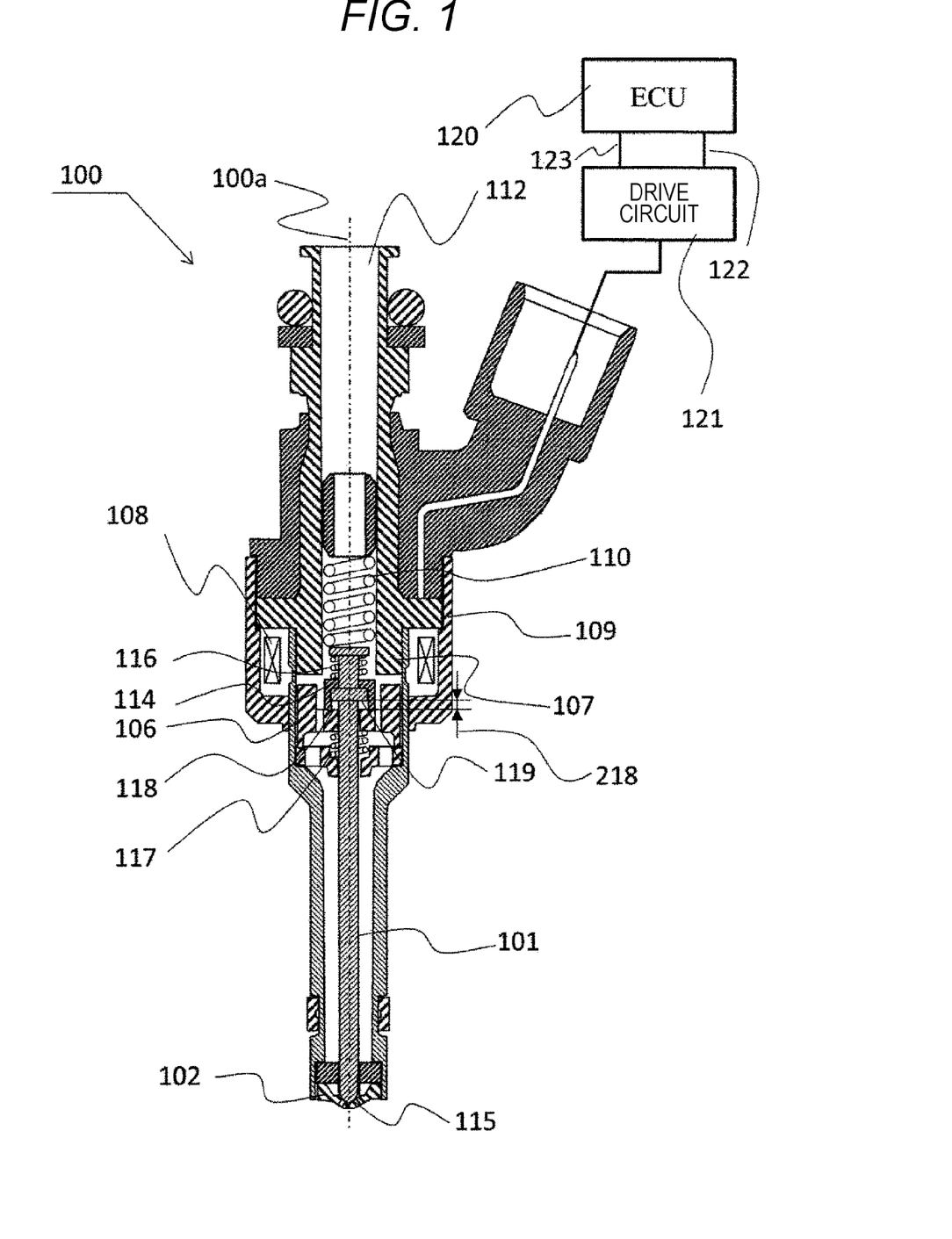
FIG. 1 is a cross-sectional view illustrating an example of a fuel injection valve according to a first embodiment of the invention.

FIG. 1 is a vertical cross-sectional view of a fuel injection device 100 in this embodiment, and a diagram illustrating an example of a configuration of an ECU (engine control unit) 120 which controls a drive circuit 121 or the fuel injection device 100 through the drive circuit 121 in order to drive the fuel injection device 100. The drive circuit 121 is called an EDU H.

In FIG. 1, the vertical cross-sectional view of the fuel injection device 100 illustrates a cross section in parallel to a central axial line 100*a*. Further, the ECU 120 and the drive circuit 121 may be configured as an integrated part. A drive device of the fuel injection device 100 is a device to generate a drive voltage of the fuel injection device. The ECU and the drive circuit may be integrally formed. The drive circuit may be formed as a single body.

The fuel injection device 100 includes a fuel supply unit 112 which supplies fuel to the upstream side, a valve seat 102 which includes a fuel injection hole 115 serving as a path of the fuel, and a movable iron core 106 which drives a valve element 101. In this embodiment, the description will be given about an example of an electromagnetic fuel injection device for an internal combustion engine which uses gasoline as fuel. Further, the valve seat 102 is disposed on the most downstream side of the fuel injection device 100.

An end of the fuel supply unit 112 on the opposite side of the valve seat 102 is connected to a fuel pipe (not illustrated). An end of the valve seat 102 on the opposite side of the fuel supply unit 112 is inserted to an intake pipe (not illustrated) or a mounting hole (insertion hole) which is formed in a combustion chamber forming member (cylinder block, cylinder head, etc.) of the internal combustion engine. The fuel injection device 100 is supplied with the fuel from the fuel pipe through the fuel supply unit 112, and injects the fuel from the end portion of the valve seat 102 to the intake pipe or into a combustion chamber. In the inner portion of the fuel injection device 100, a fuel passage is formed from the end of the fuel supply unit 112 up to the end portion of the valve seat 102 to guide the fuel almost along the central axis of the fuel injection device 100.

In a valve-closed state where a coil 108 is not energized, the valve element 101 abuts on the valve seat 102 by a force obtained by subtracting an urging force of a third spring member 117 from an urging force of a first spring member 110 and a second spring member 116 urging the valve element 101 in a valve-closing direction. This state is defined as a stable valve-closed state. In the stable valve-closed state, the movable iron core 106 abuts on an intermediate member 114 and is disposed at a valve-closed position. The valve element 101 is driven by a transmission surface 119 which transfers a load from the movable iron core 106.

In the stable valve-closed state, the intermediate member 114 is urged to the downstream side by the second spring member 116, and comes into contact with the valve element 101 and stops. The movable iron core 106 is urged to the upstream side by the third spring member 116, and comes into contact with the intermediate member 114. Since the urging force of the second spring member 116 is larger than that of the third spring member 117, a gap 218 is formed between the valve element 101 and the movable iron core 106.

The ECU 120 receives signals indicating the states of the engine from various types of sensors, and calculates an appropriate drive pulse width and an appropriate injection timing according to an operation condition of the internal combustion engine. A drive pulse output by the ECU 120 is input to the drive circuit 121 of the fuel injection device 100 through a signal line 123. The drive circuit 121 controls a voltage to be applied to the coil 108 and supplies the current. The ECU 120 communicates with the drive circuit 121 through a communication line 122, and can switch a drive current generated by the drive circuit 121 according to a pressure of the fuel to be supplied to the fuel injection device 100 and an operation condition.

The drive circuit 121 is configured to change a control constant through the communication with the ECU 120. A current waveform is changed according to the control constant. When a split injection in this embodiment is performed, the ECU 120 outputs a drive command pulse to apply a voltage for performing an intermediate energization in the split injection, or the ECU 120 transmits the control constant to the drive circuit 121 to directly supply an intermediate current from the drive circuit 121 as a method for controlling the split injection.

Figure 2:
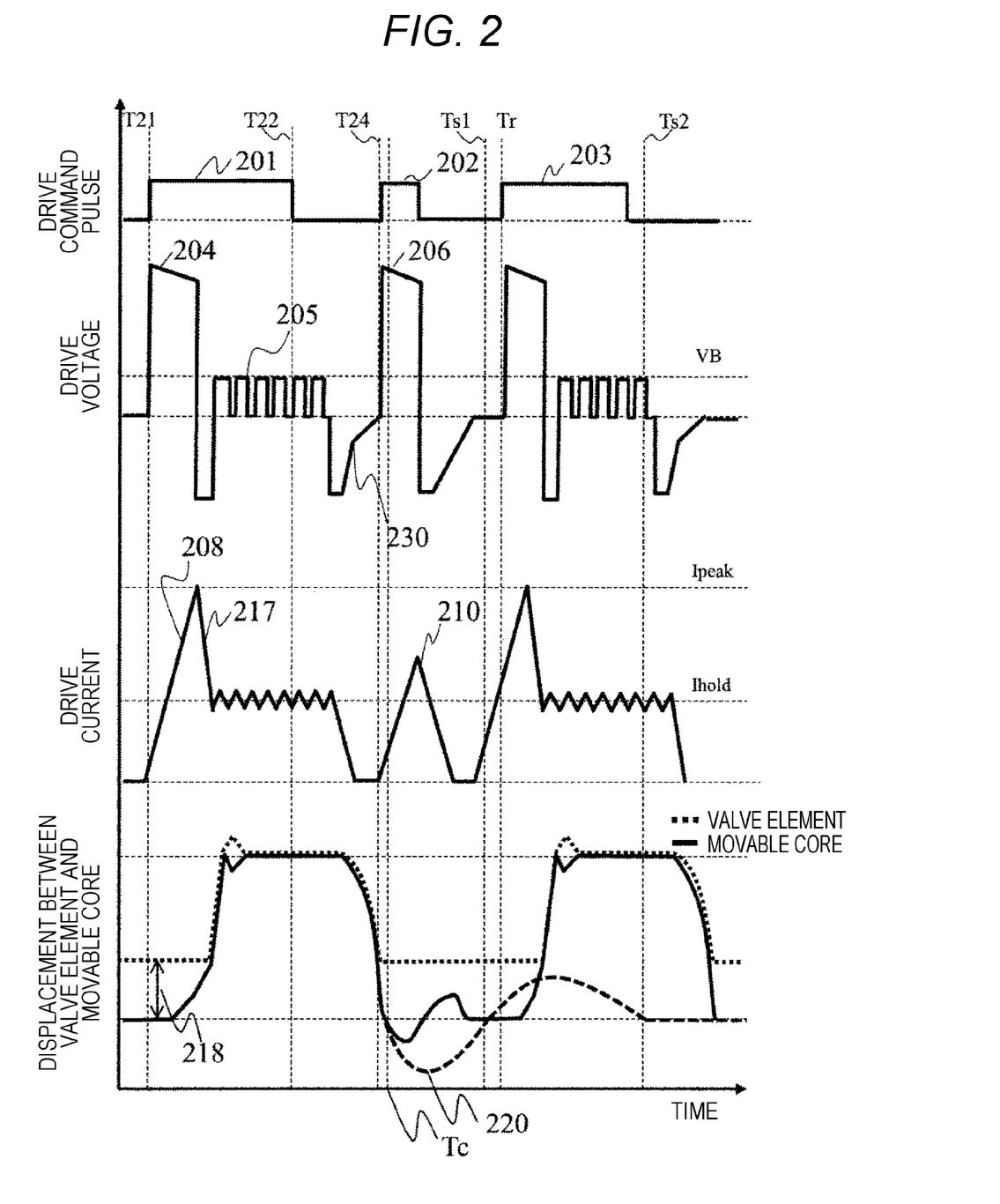
FIG. 2 is a diagram illustrating a behavior of an internal part of the fuel injection valve according to the first embodiment of the invention, and illustrating a voltage and a current which are applied.

FIG. 2 is a diagram illustrating a relation between timing of the drive pulse output from the ECU 120, a drive voltage and a drive current (exciting current) supplied to the fuel injection device, and a behavior of the movable iron core 106.

When the drive command pulse 201 is input, a high voltage 204 which is boosted higher than a battery voltage VB is applied from a high voltage source, and the current starts to be supplied to the coil 108. After the coil 108 is energized, an electromagnet configured by a fixed iron core 107, the coil 108, and a housing 109 generates a magnetomotive force. With the magnetomotive force, a magnetic flux flows around a magnetic path which is configured by the fixed iron core 107, the housing 109, and the movable iron core 106 which are configured to surround the coil 108. At this time, the magnetic attraction force is applied between the movable iron core 106 and the fixed iron core 107, and the movable iron core 106 and the intermediate member 114 are displaced toward the fixed iron core 107. Thereafter, the movable iron core 106 is displaced until the transmission surface 119 of the valve element and a transmission surface 118 of the movable iron core abut on each other. Further, the valve element 101 keeps the abutting state with the valve seat 102.

When the movable iron core 106 is displaced by the gap 218 which is generated between the valve element and the movable iron core and the transmission surface 119 of the valve element and the transmission surface 118 of the movable iron core come into conflict to each other, the valve element 101 raises the energy of the movable iron core 106 to the upstream side, and the valve element 101 is separated from the valve seat 102. With this configuration, a gap is formed in the valve seat, the fuel passage is opened, and the fuel is injected through the fuel injection hole 115. The valve element 101 is steeply displaced by the movable iron core 106 having kinetic energy.

When the movable iron core 106 abuts on the fixed iron core 107, the valve element 101 is displaced onto the upstream side, and the movable iron core 106 is displaced downward. When the fixed iron core 107 and the movable iron core 106 come into conflict to each other, the valve element 101 and the movable iron core 106 are separated, the movable iron core 106 is displaced onto the downstream side, but soon stops and is stabilized at a target lift position. This state is defined as a stable valve-opened state.

On the other hand, when a current value reaches a predetermined peak current value Ipeak, the application of the high voltage 204 is stopped to cause the applying voltage to be 0 V or less. Then, the current value is lowered as illustrated with a current profile 217. Thereafter, the battery voltage VB and 0 V are repeatedly applied, and are controlled to be a hold current value Ihold.

Subsequently, when a drive pulse width is turned off at timing T22, the current supply to the coil 108 is blocked, the magnetic flux generated in the magnetic circuit vanishes and also the magnetic attraction force vanishes.

As a result, the movable iron core 106 having no magnetic attraction force is pressed back to a close position by the load of the first spring member 110 and a fuel pressure where the valve element 101 comes into contact with the valve seat 102. A force working on the valve element 101 by the first spring member 110 is transferred to the movable iron core 106 through the transmission surface 119 on a side near the valve element and the transmission surface 118 on a side near the movable iron core. After the valve element 101 comes into contact with the valve seat 102 at timing T24, the transmission surface 118 on a side near the movable iron core is separated from the transmission surface 119 on a side near the valve element, and keeps moving downward (the valve-closing direction). As illustrated with a movable iron core profile 213 after the valve is closed, the movable iron core 106 is pressed back by the third spring member 117, and the movable iron core 106 and the intermediate member 114 come into conflict to each other again at timing Ts1. At this time point, when a force working on the movable iron core 106 upward becomes larger than a force working on the valve element 101 downward, the intermediate member 114 is pressed upward, and the gap 218 between the valve element 101 and the movable iron core 106 becomes small.

When a second drive command 203 is turned on in a state where the gap 218 is smaller than that in the stable valve-closed state, a sufficient approach-run distance is not obtained, a behavior until the valve element 101 is opened is changed, and an injection amount varies.

In this way, since the movable iron core 106 keeps moving after the valve element 101 comes into conflict to the valve seat 102, when the next split injection is performed in a state where the gap 218 between the movable iron core 106 and the valve element 101 is small, the behavior of the valve element 101 varies according to a deviation in position and speed of the movable iron core. When time passes by timing Ts2 from a first drive command, the movable iron core 106 enters the stable valve-closed state again, and the motion of the valve element 101 is stabilized.

Therefore, in order to freely control an interval between a first drive command 201 and the second drive command 203, there is a need to alleviate a phenomenon that the gap between the movable iron core 106 and the valve element 101 becomes less after the valve is closed.

In the configuration of this embodiment in order to improve controllability of the first drive command 201 and the second drive command 203, when the energization to the coil 108 is blocked to displace the movable iron core 106 in a direction away from the fixed core 107 after the movable iron core 106 is attracted to the fixed core 107 by energizing the coil 108, a drive command 202 is turned on and the high voltage 204 is applied. Then, the coil 108 is energized as much as not to come into contact with the valve element 101 (intermediate energization). A CPU (control unit) of the ECU 120 determines whether the intermediate energization is performed on the basis of an injection interval of the fuel injection valve according to the interval between the first drive command 201 and the second drive command 203. A drive pulse 202 is a drive pulse for the intermediate energization flowing between a first fuel injection period and a second fuel injection period. However, the valve element 101 is not opened by the drive pulse 202. The inventors have found out that a period for the intermediate energization is desirably 0.3 ms or less.

The CPU (control unit) of the ECU 120 is configured to output a control command to perform an intermediate energization 210 in a case where an injection interval Tr of the fuel injection device 100 is equal to or less than a first setting value.

The CPU (control unit) of the ECU 120 makes control to perform the intermediate energization 210 in a case where a second injection start timing Tr of the fuel injection device 100 falls between the first setting value and a second setting value smaller than the first setting value. In a case where the injection interval of the fuel injection valve is less than the first setting value, the CPU makes control not to perform the intermediate energization.

The CPU (control unit) of the ECU 120 makes control to perform the intermediate energization 210 in a case where the injection interval Tr of the fuel injection device 100 falls between the first setting value and the second setting value larger than the first setting value. In a case where the injection interval of the fuel injection device 100 is larger than the second setting value, the CPU makes control not to perform an intermediate energization 206.

The CPU (control unit) of the ECU 120 makes control to perform the intermediate energization 210 in a case where the injection interval Tr of the fuel injection device 100 falls between the first setting value Ts1 and a second setting value Ts2 larger than the first setting value. In a case where the intermediate energization is not performed, the first setting value Ts1 is set to correspond to a value when the movable iron core 106 comes into conflict to a member where the gap 218 is formed between the movable iron core 106 and the valve element 101.

The CPU (control unit) of the ECU 120 makes control to perform the intermediate energization 210 in a case where the injection interval Tr of the fuel injection device 100 falls between the first setting value Ts1 and the second setting value Ts2 larger than the first setting value Ts1. In a case where the intermediate energization 210 is not performed, the second setting value is set to correspond to a value at timing when the movable iron core 106 returns to the stable valve-closed state Ts2.

The CPU (control unit) of the ECU 120 makes control to perform the intermediate energization 210 after timing T24 when the energization to the coil 108 is blocked and the valve element 101 of the fuel injection device 100 comes into conflict to the valve seat 102 from the stable valve-opened state.

The CPU (control unit) of the ECU 120 makes control to perform the intermediate energization 210 after timing T24 when the valve element 106 comes into conflict to the valve seat 102 and before a timing when the valve element 106 reaches a lowest point 220.

The CPU (control unit) of the ECU 120 detects a position where the valve element 101 of the fuel injection device 100 comes into conflict to the valve seat 102 from a position 402 of an inflection point of a voltage value 230 which is applied to the coil 108. The intermediate energization 210 is performed at timing when the valve element 101 and the valve seat 102 come into conflict to each other.

In addition, the first drive command 201 and the second drive command 203 are output during one injection stroke. In other words, in this embodiment, the amount of fuel injected during one injection stroke is split and injected in plural times containing at least drive pulses 201 and 203.

Further, "one injection stroke" means one combustion cycle (strokes of intake, compression, explosion, and exhaust in a 4-cycle system).

Hereinafter, operations and effects of this embodiment will be described.

The energization to the coil 108 from the stable valve-opened state is blocked, the movable iron core 106 and the valve element 101 are displaced on the downstream side, the drive command 202 is input immediately after the valve element 101 and the valve seat 102 come into conflict to each other, and the intermediate energization 210 is performed on the coil 108. Therefore, the magnetic attraction force is generated between the movable iron core 106 and the fixed iron core 107 to rapidly attenuate the motion of the movable iron core 106, and a time taken for stopping the movable iron core 106 can be shortened. As a result, at timing when the second drive command 203 is input, the position of the movable iron core 106 reaches the stable valve-opened state, and a stable injection amount is achieved.

Figure 3:
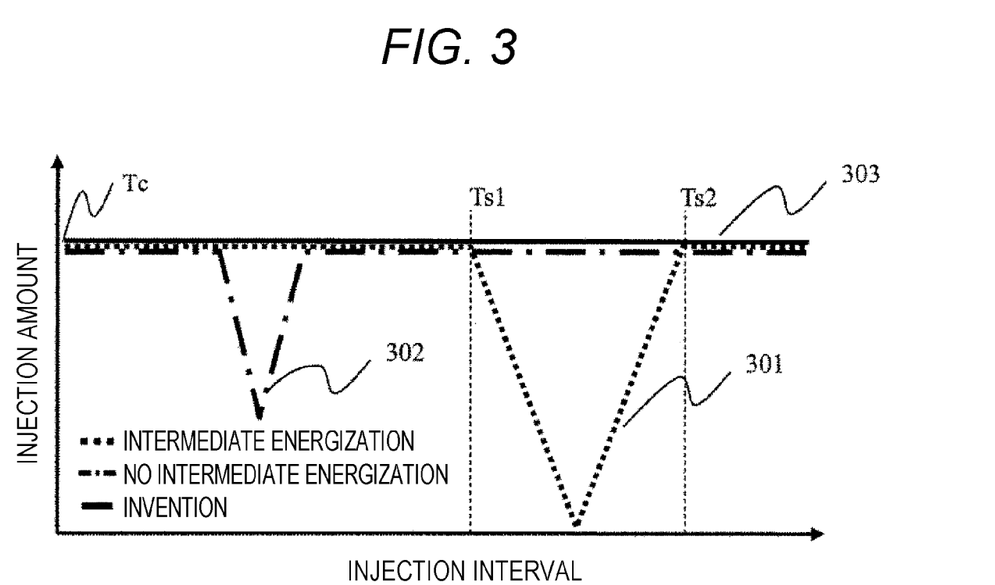
FIG. 3 is a diagram illustrating a relation between an injection amount and an injection interval according to the first embodiment of the invention.

FIG. 3 is a diagram illustrating a relation between the injection amount and the injection interval in the second drive command. In a case where a second drive command start point Tr is between a first setting value Tr1 and a second setting value Tr2, an injection amount (no intermediate energization) 301 in the second drive command varies largely. A range of the variation of the injection amount in the second drive command varies by the intermediate energization 210 to the coil 108. In a case where the second drive command Tr is larger than the first setting value Ts1 and smaller than the second setting value Ts2, the variation of the injection amount 303 in the second drive command becomes small by performing the intermediate energization.

In addition, timing for cutting off the drive pulse 202 may be smaller than that at the lowest position 220 of the movable iron core 106 in a case where there is no intermediate energization of the movable iron core 106. The position of the lowest point 220 is a position where the speed becomes zero and the energy onto the upstream side becomes larger. This is because, when the intermediate energization is performed longer than the lowest position 220, the movable iron core 106 moves increasingly in the kinetic energy onto the upstream side and, when the movable iron core comes into conflict to the intermediate member 113 again, the intermediate member 220 is pushed up on the upstream side, and a time taken for reaching a stable state when the valve is closed becomes longer. As described above, the movable iron core 106 is accelerated again by setting a cutting-off timing of an intermediate current 206, and comes into conflict to the intermediate member 106. The gap 218 becomes small, and the injection can be suppressed from being unstable.

As described above, in this embodiment, the energization to the coil from the stable valve-opened state is blocked, the movable iron core and the valve element are displaced on the downstream side, the drive command is input immediately after the valve element and the valve seat come into conflict to each other, and the intermediate energization is performed on the coil. Therefore, the magnetic attraction force is generated between the movable iron core and the fixed iron core to rapidly attenuate the motion of the movable iron core, and a time taken for stopping the movable iron core can be shortened. As a result, at timing when the second drive command is input, the position of the movable iron core reaches the stable valve-opened state, and a stable injection amount is achieved. In addition, since whether to perform the intermediate energization is controlled according to the injection interval, a stable injection amount can be achieved even if the injection interval varies.

Further, while the above description has been given about the fuel injection valve which is configured to make a gap between the movable iron core and the valve element in the valve-closed state, the effect of achieving the object of the invention can be obtained even in a fuel injection valve which is configured not to make a gap between the movable iron core and the valve element.

Second Embodiment

Figure 4:
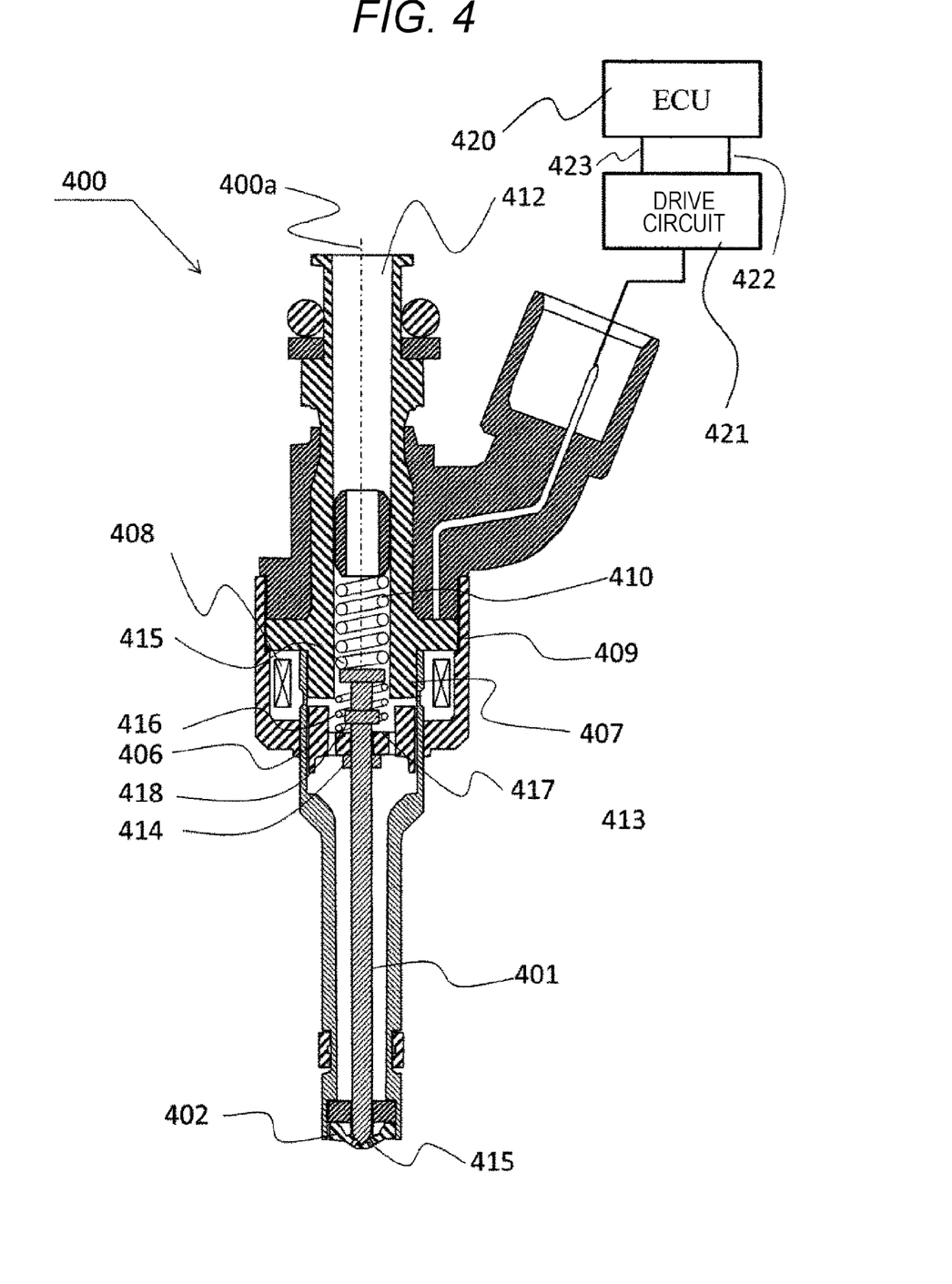
FIG. 4 is a cross-sectional view illustrating an example of a fuel injection valve according to a second embodiment of the invention.
Figure 5:
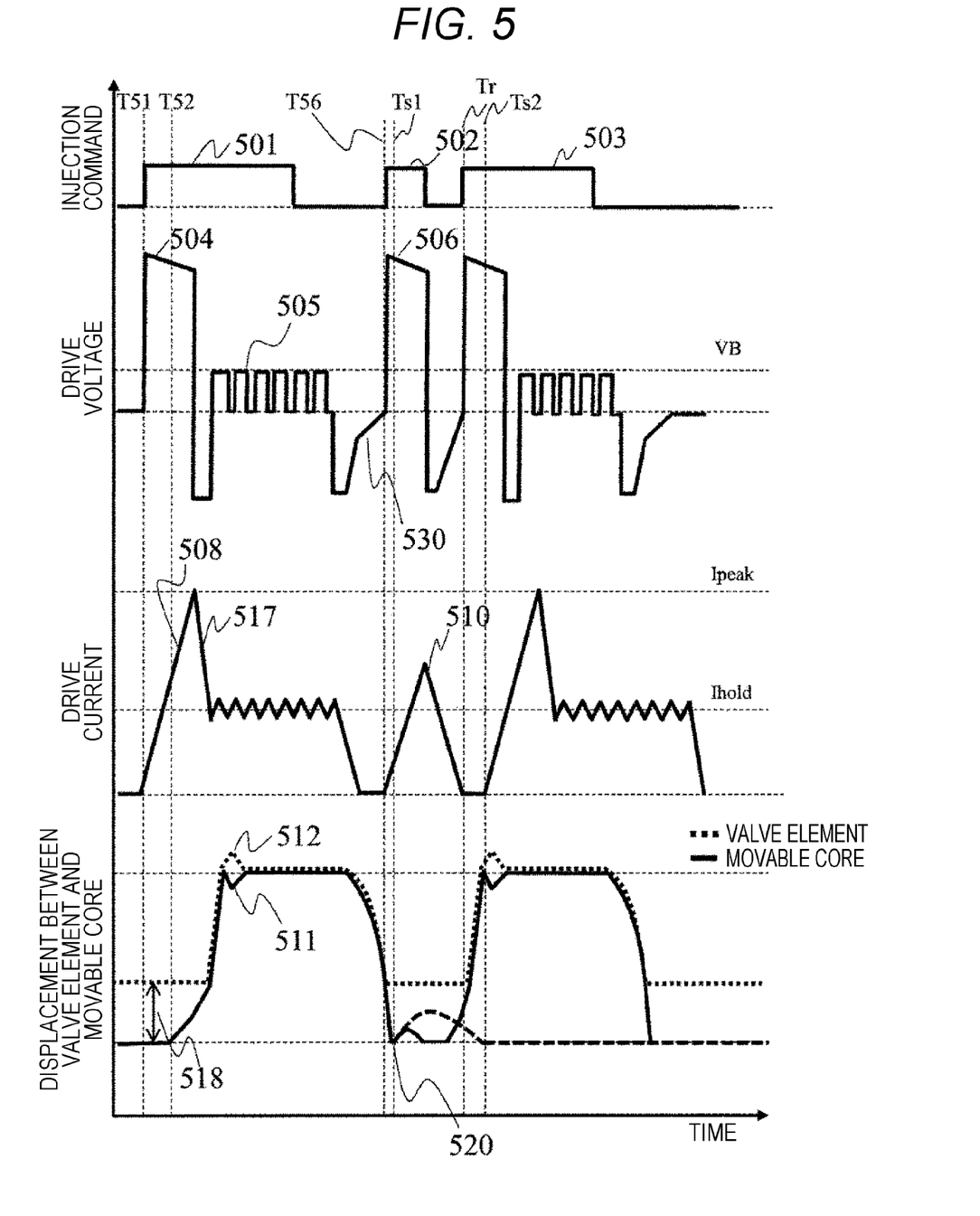
FIG. 5 is a diagram illustrating a behavior of an internal part of the fuel injection valve according to the second embodiment of the invention, and illustrating a voltage and a current which are applied.

Hereinafter, the description will be given about configurations and operations of a fuel injection device according to a second embodiment of the invention using FIGS. 4 to 6.

First, configurations and basic operations of the fuel injection device of this embodiment will be described using FIG. 4. FIG. 4 is a vertical cross-sectional view of a fuel injection device 400 of this embodiment, and a diagram illustrating an example of the configurations of a drive circuit 421 and an ECU (engine control unit) 420 for driving the fuel injection device 400. Further, the ECU 420 and the drive circuit 421 may be configured as an integrated component. At least a drive device of the fuel injection device (an electromagnetic fuel injection valve) is a device to generate a drive voltage of the fuel injection device, and may be configured to have the ECU and the drive circuit integrally formed, or may be configured as a single drive circuit.

The ECU 420 receives signals indicating the states of the engine from various types of sensors, and calculates an appropriate drive pulse width and an appropriate injection timing according to an operation condition of the internal combustion engine. A drive pulse output by the ECU 420 is input to the drive circuit 421 of the fuel injection device through a signal line 423. The drive circuit 421 controls a voltage to be applied to the coil 408 and supplies the current. The ECU 420 communicates with the drive circuit 421 through a communication line 422, and can switch a drive current generated by the drive circuit 421 according to a pressure of the fuel to be supplied to the fuel injection device and an operation condition. The drive circuit 421 is configured to change a control constant through the communication with the ECU 420. A current waveform is changed according to the control constant. When a split injection in this embodiment is performed, the ECU 420 outputs a command pulse to apply a voltage for performing an intermediate current in the split injection, or the ECU 420 transmits the control constant to the drive circuit 421 to directly supply an intermediate current from the drive circuit 421 as a method for controlling the split injection.

Subsequently, the description will be given about configurations and operations of the fuel injection device using the vertical cross-sectional view of the fuel injection device of FIG. 4 and the relation of the drive pulses and a displacement between a valve element 402 and a movable iron core 406 of FIG. 5. FIG. 5 is a diagram illustrating a relation between timing of the drive pulses output from the ECU 420, a drive voltage and a drive current (exciting current) supplied to the fuel injection device, and a behavior of a movable iron core 402.

In the valve-closed state where the coil 408 is not energized, the valve element 401 abuts on a valve seat 402 by a first spring member 410 urging the valve element 401 to the valve-closing direction. This state is defined as a closed valve stop state. In the closed valve stop state, the movable iron core 406 abuts on a stopper 414 which is a member to form the gap, and is disposed at a valve-closed position. The valve element 401 is driven through a transmission surface 417 on a side near the movable iron core which transfers a load from the movable iron core 406, and a transmission surface 418 on a side near the valve element.

In the stable valve-closed state, the movable iron core is urged on the downstream side by a second spring member 416 which is provided between the upstream side of the valve element 101 and the movable iron core 406. The movable iron core comes into contact with the stopper 41 and stops. The movable iron core 406 is urged downward by the second spring member 413, and comes into contact with the stopper 414. Therefore, a gap 518 is formed between the transmission surface 418 on a side near the valve element and the transmission surface 417 on a side near the movable iron core.

Hereinafter, the operation after energization will be described. When a drive pulse 401 is input, a high voltage 404 which is boosted higher than the battery voltage VB is applied from a high voltage source, and the current starts to be supplied to the coil 408. After the coil 408 is energized, an electromagnet configured by a fixed iron core 406, the coil 408, and a housing 409 generates a magnetomotive force. With the magnetomotive force, a magnetic flux flows around a magnetic path which is configured by the fixed iron core 406, the housing 409, and the movable iron core 406 which are configured to surround the coil 408. At this time, the magnetic attraction force is applied between the movable iron core 406 and the fixed iron core 406, and the movable iron core 406 and the stopper 414 are displaced toward the fixed iron core 406.

Thereafter, the movable iron core 406 is displaced until the transmission surface 418 on a side near the valve element and the transmission surface 417 on a side near the movable iron core abut on each other. Further, the valve element 401 keeps the abutting state with the valve seat 402. Thereafter, when the movable iron core 406 comes into conflict to the transmission surface 417, the valve element 401 receives the impact from the movable iron core 406 and is pulled up, and the valve element 401 is separated from the valve seat 402. Therefore, the gap is formed in the valve seat, the fuel passage is opened, and the fuel is injected through an injection hole 415. Since the impacted valve element is displaced to the upstream side, the valve element 401 is rapidly displaced.

When the movable iron core 406 is displaced by the gap 518 generated between the valve element and the movable iron core, and the movable iron core 406 abuts on the fixed iron core 407, the valve element 401 is displaced upward, and the movable iron core 406 is displaced downward. When the fixed iron core 407 and the movable iron core 406 come into conflict to each other, the valve element 402 and the movable iron core 406 are separated, the movable iron core 406 is displaced downward, and the valve element 402 are displaced to the upstream side and then stops and is stabilized at the target lift position. As a result, the valve element 401 is separated from the valve seat 402, and the supplied fuel is injected from a plurality of injection holes 415. This state is defined as a stable valve-opened state.

On the other hand, when the current value reaches a predetermined peak current value Ipeak, the high voltage 404 is stopped being applied to set the applying voltage to 0 V or less, and the current value is lowered as illustrated with a current profile 517. Thereafter, the battery voltage VB and 0 V are repeatedly applied, and are controlled to be a hold current value Ihold.

Subsequently, when a drive pulse width is turned off at timing T52, the current supply to the coil 408 is blocked, the magnetic flux generated in the magnetic circuit vanishes and also the magnetic attraction force vanishes.

As a result, the movable iron core 402 having no magnetic attraction force is pressed back to a close position by the load of the first spring member 410 and a fuel pressure where the valve element 401 comes into contact with the valve seat 402. After the valve element 401 comes into contact with the valve seat 402 at timing T56, the transmission surface 418 of the movable iron core 402 is separated from the transmission surface 417 of the valve element 401, and keeps moving downward (the valve-closing direction). As illustrated with a movable iron core profile 513 after the valve is closed, the movable iron core 402 comes into conflict to the stopper 414, and the conflict energy causes the movable iron core 406 to jump up, and the gap 518 between the valve element 401 and the movable iron core 406 becomes small.

When a second drive command 403 is turned on in a state where the gap 518 is smaller than that in the stable valve-closed state, a sufficient approach-run distance is not obtained, a behavior until the valve element 401 is opened is changed, and an injection amount is deviated.

In this way, since the movable iron core 406 comes into contact with the stopper 414, and the movable iron core 406 jumps up after the valve element 401 comes into conflict to the valve seat 402, when the next injection is performed in a state where the gap 518 between the movable iron core 406 and the valve element 402 is small, the behavior of the valve element 401 becomes unstable according to a deviation in position and speed of the movable iron core. When a time elapses from timing T58, the movable iron core 406 enters the stable valve-closed state again. Therefore, in order to freely control an interval between a first drive command 401 and the second drive command 403, there is a need to reduce a time for the gap between the movable iron core 406 and the valve element 401 to be reduced after the valve is closed.

In the configuration of this embodiment in order to improve controllability of the first drive command 401 and the second drive command 403, when the energization to the coil 408 is blocked to displace the movable iron core 406 in a direction away from the fixed core 407 after the movable iron core 406 is attracted to the fixed core 407 by energizing the coil 408, a drive command 402 is turned on and the high voltage 404 is applied. Then, the coil 408 is energized as much as not to come into contact with the valve element 401 (intermediate energization). A CPU (control unit) of the ECU 421 determines whether the intermediate energization is performed on the basis of an injection interval of the fuel injection valve according to the interval between the first drive command 401 and the second drive command 403.

A drive pulse 402 is a drive pulse for the intermediate energization flowing between a first fuel injection period and a second fuel injection period. However, the valve element 401 is not opened by the drive pulse 202.

The CPU (control unit) of the ECU 420 is configured to output a control command to perform an intermediate energization 502 in a case where an injection interval Tr of the fuel injection device 400 is equal to or less than a first setting value.

The CPU (control unit) of the ECU 420 makes control to perform the intermediate energization 502 in a case where a second injection start timing of the fuel injection device 400 falls between the first setting value and the second setting value smaller than the first setting value. In a case where the injection interval of the fuel injection device 400 is less than the first setting value, the CPU makes control not to perform the intermediate energization.

The CPU (control unit) of the ECU 420 makes control to perform the intermediate energization 410 in a case where the injection interval Tr of the fuel injection device 400 falls between the first setting value and the second setting value larger than the first setting value. In a case where the injection interval of the fuel injection device 400 is larger than the second setting value, the CPU makes control not to perform an intermediate energization 502.

The CPU (control unit) of the ECU 420 makes control to perform the intermediate energization 502 in a case where the injection interval Tr of the fuel injection device 400 falls between the first setting value and the second setting value larger than the first setting value. In a case where the intermediate energization is not performed, the first setting value is set to correspond to timing Ts1 when the movable iron core comes into conflict to the member 414 where the gap 518 is formed between the movable iron core 406 and the valve element 402.

The CPU (control unit) of the ECU 420 makes control to perform the intermediate energization 502 in a case where the injection interval Tr of the fuel injection device 400 falls between the first setting value Ts1 and the second setting value larger than the first setting value Ts1. In a case where the intermediate energization 502 is not performed, the second setting value is set to correspond to timing Ts2 when the movable iron core 406 returns to the stable valve-closed state.

The CPU (control unit) of the ECU 420 makes control to perform the intermediate energization 540 after timing T56 when the energization to the coil 408 is blocked and the valve element 401 of the fuel injection device 400 comes into conflict to the valve seat 402 from the stable valve-opened state.

The CPU (control unit) of the ECU 420 makes control to perform the intermediate energization 510 after timing T56 when the valve element 406 comes into conflict to the valve seat 402 and before a timing when the valve element 406 reaches a lowest point 520.

The CPU (control unit) of the ECU 410 detects a position where the valve element 401 of the fuel injection device 400 comes into conflict to the valve seat 402 from a position 530 of an inflection point of a voltage value which is applied to the coil 408. The intermediate energization 502 is performed at timing when the valve element 401 and the valve seat 402 come into conflict to each other.

In addition, the first drive command 401 and the second drive command 403 are output during one injection stroke. In other words, in this embodiment, the amount of fuel injected during one injection stroke is split and injected in plural times containing at least drive pulses 501 and 503. Further, "one injection stroke" means one combustion cycle (strokes of intake, compression, explosion, and exhaust in a 4-cycle system).

Hereinafter, operations and effects of this embodiment will be described. The energization to the coil 408 from the stable valve-opened state is blocked, the movable iron core 406 and the valve element 401 are displaced on the downstream side, the drive command 402 is input immediately after the valve element 401 and the valve seat 402 come into conflict to each other, and the intermediate energization 540 is performed on the coil 408. Therefore, the magnetic attraction force is generated between the movable iron core 406 and the fixed iron core 407 to rapidly attenuate the motion of the movable iron core 402, and a time taken for stopping the movable iron core 402 can be shortened. As a result, at timing when the second drive command 403 is input, the position of the movable iron core 406 reaches the stable valve-opened state, and a stable injection amount is achieved.

Figure 6:
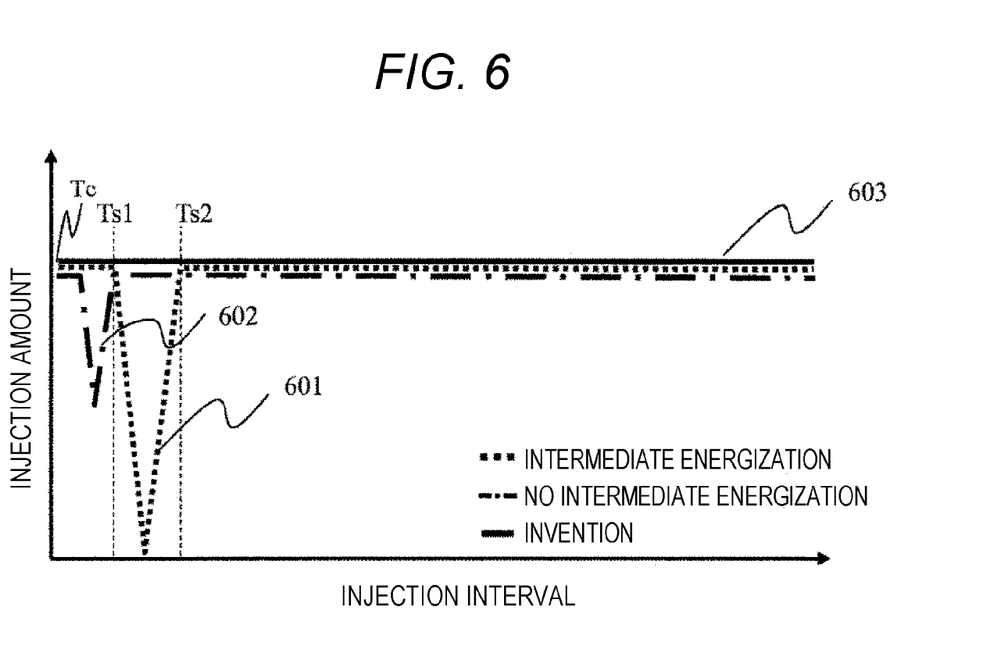
FIG. 6 is a diagram illustrating a relation between an injection amount and an injection interval according to the second embodiment of the invention.

FIG. 6 is a diagram illustrating a relation between the injection amount and the injection interval in the second drive command. In a case where a second drive command start point Tr is between a first setting value Tr1 and a second setting value Tr2, an injection amount (no intermediate energization) 601 in the second drive command varies largely. A range of the variation of the injection amount in the second drive command varies by the intermediate energization 510 to the coil 408. In a case where the second drive command Tr is larger than the first setting value Ts1 and smaller than the second setting value Ts2, the variation of the injection amount 603 in the second drive command becomes small by performing the intermediate energization.

In addition, timing for cutting off the drive pulse 402 may be smaller than that at the lowest position 420 (that is, the position where the movable iron core comes into conflict with the stopper 414) of the movable iron core 406 in a case where there is no intermediate energization of the movable iron core 406. The position of the lowest point 420 is a position where the speed becomes zero and the energy onto the upstream side becomes larger. This is because, when the intermediate energization 410 is performed longer than the lowest position 420, the movable iron core 406 moves increasingly in kinetic energy onto the upstream side, and a time taken for reaching a stable state when the valve is closed becomes longer after the movable iron core comes into conflict to the stopper 413 again. As described above, by setting a cutting-off timing of the intermediate current 506, the gap 518 becomes small by rebounding caused by the conflict of the movable iron core 406 to the stopper 414, and it is possible to suppress that the injection becomes unstable.

REFERENCE SIGN LIST

100 fuel injection device
101 valve element
102 valve seat
106 movable iron core
107 fixed iron core
108 coil
109 housing
110 first spring member
114 intermediate member
115 injection hole
116 second spring member
117 third spring member
118 transmission surface near movable iron core
119 transmission surface near valve element
120 ECU
121 drive circuit
400 fuel injection device
401 valve element
402 valve seat
406 movable iron core
407 fixed iron core
408 coil
409 housing
410 first spring member
414 intermediate member
415 injection hole
416 second spring member
418 transmission surface near movable iron core
419 transmission surface near valve element
420 ECU
421 drive circuit

The invention claimed is:

1. A control device of a fuel injection device which includes a valve element to open a fuel passage by being separated from a valve seat, a movable iron core to perform an opening/closing operation of the valve element, and a fixed iron core to attract the movable iron core when a current flows to a coil, the control device comprising:
a control unit which performs an intermediate energization in which the coil is energized again when the coil is energized to attract the movable iron core to the fixed iron core and then the energizing to the coil is blocked and the movable iron core is displaced in a direction away from the fixed core,
wherein the control unit determines whether the intermediate energization is performed according to an injection interval of the fuel injection device and makes a determination not to perform the intermediate energization in a case where the injection interval of the fuel injection device satisfies a predetermined condition.

2. The control device of the fuel injection device according to claim 1,
wherein the control unit makes control to perform the intermediate energization in a case where the injection interval of the fuel injection device is equal to or less than a setting value.

3. The control device of the fuel injection device according to claim 1,
wherein the control unit makes control to perform the intermediate energization in a case where the injection interval of the fuel injection device falls between a first setting value and a second setting value larger than the first setting value.

4. The control device of the fuel injection device according to claim 1,
wherein the control unit makes control to perform the intermediate energization in a case where the injection interval of the fuel injection device falls between a first setting value and a second setting value larger than the first setting value, and makes control not to perform the intermediate energization in a case where the injection interval of the fuel injection device is less than the first setting value.

5. The control device of the fuel injection device according to claim 1,
wherein the control unit makes control to perform the intermediate energization in a case where the injection interval of the fuel injection device falls between a first setting value and a second setting value larger than the first setting value, and makes control not to perform the intermediate energization in a case where the injection interval of the fuel injection device is larger than the second setting value.

6. The control device of the fuel injection device according to claim 1,
wherein the control unit makes control to perform the intermediate energization in a case where the injection interval of the fuel injection device falls between a first setting value and a second setting value larger than the first setting value, and sets the first setting value to correspond to a value when the movable iron core comes into conflict to a member for forming a preliminary stroke gap in a case where the intermediate energization is not performed.

7. The control device of the fuel injection device according to claim 1,
wherein the control unit makes control to perform the intermediate energization in a case where the injection interval of the fuel injection device falls between a first setting value and a second setting value larger than the first setting value, and sets the second setting value to correspond to a value when the movable iron core returns to an initial position in a case where the intermediate energization is not performed.

8. The control device of the fuel injection device according to claim 1,
wherein the control unit makes control to perform the intermediate energization after a valve of the fuel injection device is completely closed.

9. The control device of the fuel injection device according to claim 1,
wherein the control unit makes control to perform the intermediate energization after a valve of the fuel injection device is completely closed and before the valve reaches a lowest point.

10. The control device of the fuel injection device according to claim 1,
wherein the control unit differentiates twice a voltage to be applied to the coil so as to detect whether a valve of the fuel injection device is closed, and makes control to perform the intermediate energization after the valve is completely closed.

11. The control device of the fuel injection device according to claim 1,
wherein the fuel injection device operates such that a gap is formed with respect to the valve element in a state where the movable iron core is at an initial position, and the gap disappears before the movable iron core comes into conflict to the magnetic core.

* * * * *